United States Patent
Kim et al.

(10) Patent No.: US 11,466,688 B2
(45) Date of Patent: Oct. 11, 2022

(54) ELECTRIC COMPRESSOR CAPABLE OF FIXING A SHAFT SEAL

(71) Applicant: Hanon Systems, Daejeon (KR)

(72) Inventors: Hong Min Kim, Dajeon (KR); Kweon Soo Lim, Daejeon (KR); Soo Cheol Jeong, Daejeon (KR)

(73) Assignee: Hanon Systems, Daejeon (KR)

( * ) Notice: Subject to any disclaimer, the term of this patent is extended or adjusted under 35 U.S.C. 154(b) by 71 days.

(21) Appl. No.: 16/763,428

(22) PCT Filed: Oct. 2, 2018

(86) PCT No.: PCT/KR2018/011674
§ 371 (c)(1),
(2) Date: May 12, 2020

(87) PCT Pub. No.: WO2019/112159
PCT Pub. Date: Jun. 13, 2019

(65) Prior Publication Data
US 2021/0071666 A1    Mar. 11, 2021

(30) Foreign Application Priority Data
Dec. 8, 2017 (KR) .......................... 10-2017-0168334

(51) Int. Cl.
*F04B 27/08* (2006.01)
*F01C 19/00* (2006.01)
(Continued)

(52) U.S. Cl.
CPC ............. *F04C 27/00* (2013.01); *F01C 19/005* (2013.01); *F04C 18/0215* (2013.01); *F04C 2240/30* (2013.01); *F04C 2240/60* (2013.01)

(58) Field of Classification Search
CPC ...... F04C 27/00; F04C 27/009; F01C 19/005; F04B 27/0821
See application file for complete search history.

(56) References Cited

U.S. PATENT DOCUMENTS

| | | | | |
|---|---|---|---|---|
| 2001/0048885 A1* | 12/2001 | Gennami | ............ | F04C 27/009 418/55.6 |
| 2006/0162546 A1* | 7/2006 | Hosoi | ................ | F04B 27/1036 92/71 |
| 2013/0028730 A1* | 1/2013 | Hirata | ................. | F04B 39/121 415/229 |

FOREIGN PATENT DOCUMENTS

| | | |
|---|---|---|
| JP | 2003-322261 A | 11/2003 |
| JP | 2007-529700 A | 10/2007 |

(Continued)

OTHER PUBLICATIONS

International Search Report issued in PCT/KR2018/011675 dated Jan. 28, 2019.

*Primary Examiner* — Deming Wan
(74) *Attorney, Agent, or Firm* — Norton Rose Fulbright US LLP; James R. Crawford

(57) ABSTRACT

The present disclosure relates to an electric compressor capable of fixing a shaft seal without a retainer for fixing the shaft seal, and includes a shaft which is rotatably coupled inside a main housing, and a shaft seal which is press-fitted between the shaft and the main housing, seals between the shaft and the main housing by an elastic structure, prevents deformation in the elastic structure with a rigid structure formed integrally with the elastic structure, and maintains the coupled position by a frictional force of the elastic structure.

12 Claims, 3 Drawing Sheets

(51) Int. Cl.
*F04C 27/00* (2006.01)
*F04C 18/02* (2006.01)

(56) References Cited

FOREIGN PATENT DOCUMENTS

| | | |
|---|---|---|
| JP | 2013-500441 A | 1/2013 |
| JP | 5374591 B2 | 12/2013 |
| JP | 2016-500427 A | 1/2016 |
| KR | 2008-0010677 A | 1/2008 |
| KR | 101215059 B1 | 12/2012 |
| KR | 2014-0007706 A | 1/2014 |

* cited by examiner

ELECTRIC COMPRESSOR CAPABLE OF FIXING A SHAFT SEAL

This application is a national phase under 35 U.S.C. § 371 of International Application No. PCT/KR2018/011674 filed Oct. 2, 2018, which claims the benefit of priority from Korean Patent Application No. 10-2017-0168334 filed Dec. 8, 2017, each of which is hereby incorporated herein by reference in its entirety for all purposes.

TECHNICAL FIELD

The present disclosure relates to an electric compressor, and more particularly, to an electric compressor capable of fixing a shaft seal without a retainer for fixing the shaft seal.

BACKGROUND ART

Generally, a compressor applied to an air conditioning system serves to suck gas refrigerant which has passed through an evaporator to compress the gas refrigerant into a high-temperature, high-pressure gas refrigerant state and discharge the compressed gas refrigerant into a condenser, and various types of compressors such as reciprocating, rotary, scrolling, and swash plate types are used.

Among these compressors, a compressor which uses an electric motor as a power source is commonly referred to as an electric compressor. An example of the electric compressor is disclosed in Korean Patent Application Laid-Open No. 2014-0007706.

The swash plate compressor of the related art is configured to include a drive shaft which is rotatably supported by being coupled to a center bore of a cylinder block and a shaft seal provided in a front housing, is connected to a connection path axially formed therein and has at least one connection passage formed at a position to which the shaft seal is coupled, and a rotor which is installed to a crank chamber, coupled to the drive shaft to be integrally rotated, and formed with an oil separation passage connected to the connection path.

FIG. 1 is a cross-sectional diagram schematically illustrating a structure of a typical shaft seal.

As illustrated in FIG. 1, a shaft seal 50 of a general electric compressor 10 is installed between a shaft 30 and a housing 10a, and has a retainer 70 which prevents the flow of the shaft seal 50 and fixes the shaft seal 50.

However, as an assembly structure of the shaft seal uses the retainer, additional processing for seating the retainer in the housing is essentially performed. Further, since the retainer is required to be assembled after the assembly of the shaft seal is completed, the number of parts is increased and the number of assembly steps is increased, which degrades cost competitiveness. Further, a problem is caused in that, when a tolerance in the processing portion for seating the retainer is generated, the retainer may be separated, thereby degrading the quality of the compressor.

DISCLOSURE

Technical Problem

An object of the present disclosure is to provide an electric compressor capable of fixing a shaft seal without a retainer for fixing the shaft seal.

Technical Solution

For achieving the object, an electric compressor according to the present disclosure includes: a shaft 300 which is rotatably coupled inside a main housing 100a; and a shaft seal 500 which is press-fitted between the shaft 300 and the main housing 100a, seals between the shaft 300 and the main housing 100a by an elastic structure, prevents deformation in the elastic structure with a rigid structure formed integrally with the elastic structure, and maintains the coupled position by a frictional force of the elastic structure.

A double stepped structure into which the shaft seal 500 is inserted is formed on the inner wall of the main housing 100a, and the double stepped structure may include: a first stepped part 100c which protrudes in an insertion direction of the shaft seal 500 to lock and maintain the shaft seal 500; and a second stepped part 100d which is perpendicular to the first stepped part 100c.

The second stepped part 100d may include an end (A) which protrudes from the end of the side into which the shaft seal 500 is inserted to an insertion direction of the shaft seal 500.

The first stepped part 100c may be formed to protrude further toward the shaft 300 than the end (A).

The shaft seal 500 may include: an elastic part 500a which is inserted between the first stepped part 100c and the second stepped part 100d and the shaft 300; a rigid part 500b which is inserted into the elastic part 500a; and a sealing part 500c which is inserted into the elastic part 500a.

The elastic part 500a may be made of an elastic material including rubber, the rigid part 500b may be made of a metallic material including steel, and the sealing part 500c may be made of a wear resistance material including PTFE.

The elastic part 500a may be formed to have a shape which surrounds a part of the sealing part 500c, and the rigid part 500b may be formed to have a shape which corresponds to the shape of the elastic part 500a.

A part of the sealing part 500c may be inserted into a bent portion of the elastic part 500a, the other part of the sealing part 500c may protrude outward from the elastic part 500a, and assuming that the part of the sealing part 500c which protrudes outward from the elastic part 500a is referred to as a protrusion end 502c', the protrusion end 502c' may contact the outer circumferential surface of the shaft.

The protrusion end 502c' may be bent in a direction opposite to the insertion direction while being inserted along the insertion direction of the shaft seal 500.

A width from the end of the sealing part 500c to the end of the elastic part 500a may be formed to be greater than a width between the outer circumferential surface of the shaft 300 and the second stepped part 100d.

The elastic part 500a may be compressed when the shaft seal 500 is inserted into the double stepped structure, may be restored after the shaft seal 500 is inserted into the double stepped structure, and may be locked and maintained to the first stepped part 100c and the end (A).

The shaft seal 500 may further include an auxiliary rigid part 500b' which is made of a metallic material and has a shorter length than the sealing part 500c, and the sealing part 500c of the shaft seal 500 may be inserted between one side of the auxiliary rigid part 500b' and the inside of the elastic part 500a.

The auxiliary rigid part 500b' may be spaced apart from the shaft 300.

The auxiliary rigid part 500b' may be interposed between the sealing part 500c and the rigid part 500b at the insertion direction side of the shaft seal 500 with respect to the sealing part 500c and may support the sealing part 500c and the elastic part 500a.

The shaft seal 500 may seal a back pressure chamber.

Advantageous Effects

The electric compressor according to an embodiment of the present disclosure may stably fix the shaft seal even without the retainer which fixes the shaft seal and thus reduce the number of assembly parts and the number of assembly steps, thereby improving cost competitiveness.

BEST MODE

Figure 1:
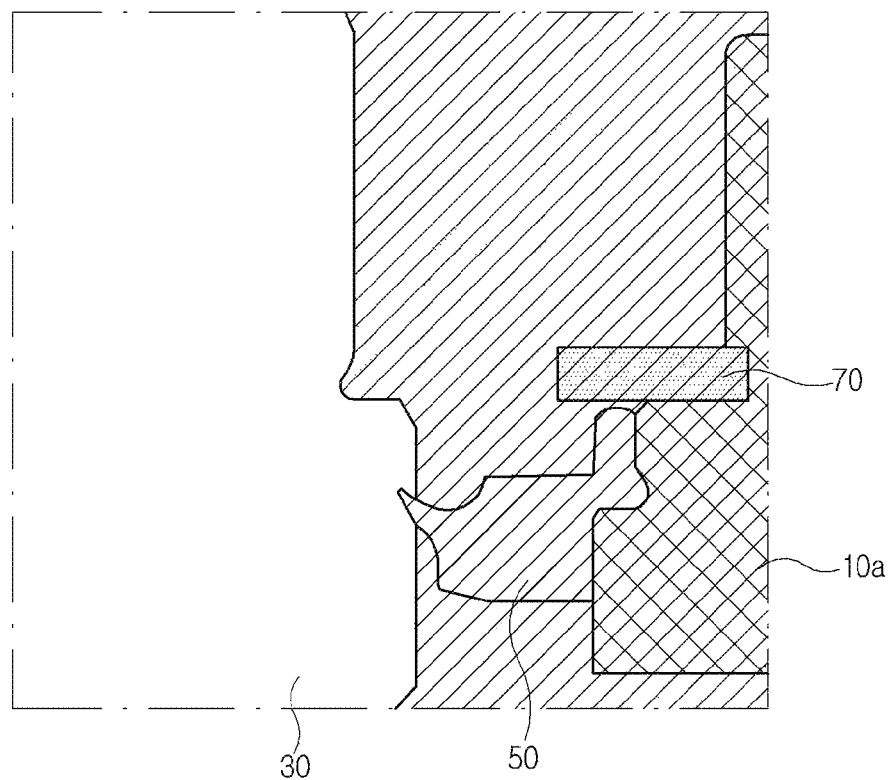
FIG. 1 is a cross-sectional diagram schematically illustrating a structure of a general shaft seal.

Hereinafter, an electric compressor according to an embodiment of the present disclosure will be described in detail with reference to the drawings.

First, a structure of a drive part will be briefly described by using an electric compressor as an example.

An electric compressor 100 according to the present disclosure is driven by a motor and an inverter, and is largely classified into a drive part 103, a compression part 105, and a control part 107.

The drive part 103 is configured to include a main housing 100a which forms an exterior, a stator 135 and a rotor 141 which are mounted coaxially within the main housing 100a. Further, the compression part 105 is configured to include a compression part housing 150 which forms an exterior and is coupled to the rear of the main housing 100a, and an orbiting scroll 153 and a fixed scroll 155 which are mounted to relatively rotate within the compression part housing 150. Further, the control part 107 is configured to include a cover housing 163 which forms an exterior and is coupled to the front of the main housing 100a, and various drive circuits, devices, and the like, such as a PCB, mounted inside the cover housing 163.

When the refrigerant is to be compressed by the electric compressor 100, external power is first applied to the control part 107 through an inlet terminal or the like, and accordingly, the control part 107 transmits an operation signal to the drive part 103 through a drive circuit or the like.

When the operation signal is transmitted to the drive part 103, the stator 135 in the form of an electromagnet press-fitted into the inner circumferential surface of the main housing 100a is energized and becomes magnetic, and accordingly, the stator 135 rotates at a high speed by electromagnetic interaction with the rotor 141.

When a rotary shaft 137 of the drive part 103 rotates at a high speed, the orbiting scroll 153 of the compression part 105 eccentrically coupled to the rear end of the rotary shaft 137 is synchronized to orbit around the rotary shaft, and accordingly, the orbiting scroll 153 compresses to the center portions of the scrolls 135, 155 refrigerant of the outer circumference of the scroll, which is fluidly connected from the drive part to the compression part, by the interaction with the fixed scroll 155 mated in an opposite state as illustrated in FIG. 1, thereby discharging the compressed refrigerant to a refrigerant line at a high pressure.

Accordingly, in order to normally keep a refrigerant discharge pressure formed by the orbiting scroll 153 having a relative movement within the fixed scroll 155 and the fixed scroll 155, that is, the output of the compressor, it is necessary to secure the oil tightness of a compression chamber 154 which is formed between the orbiting and fixed scrolls 153, 155.

Figure 2:
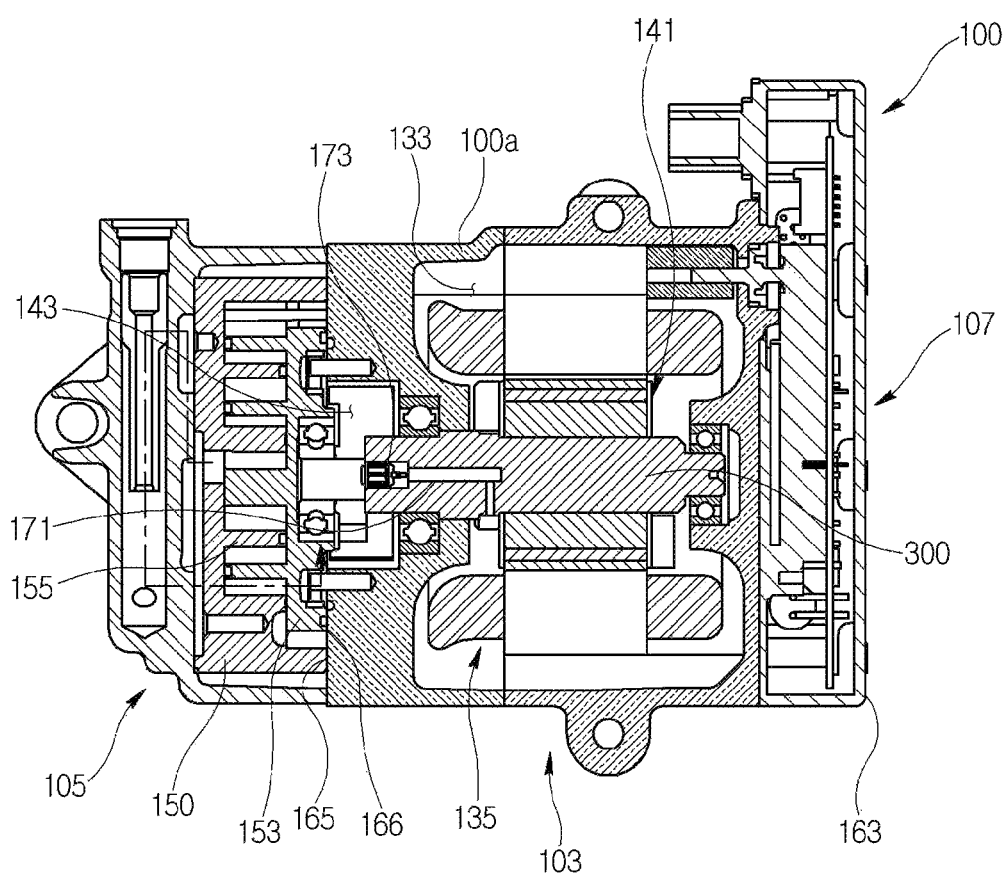
FIG. 2 is a partial perspective diagram schematically illustrating a structure of a general electric compressor.

To this end, the orbiting scroll 153 closely contacts the fixed scroll 155 by forming a back pressure chamber 143 between the back surface of the orbiting scroll 153, that is, a front end surface 166 and a rear end surface 165 of the main housing 100a, and by bypassing a part of the refrigerant, compressed within the compression chamber 154, into the back pressure chamber 143 along a passage illustrated by an arrow in FIG. 2 to accommodate the part of the refrigerant in the back pressure chamber 143 to form a back pressure.

Meanwhile, since the shaft 300 is a rotating body, and the main housing 100a is a fixed body, there is a portion which requires sealing between the shaft 300 and the main housing 100a, and in the electric compressor having a back pressure structure, a sealing structure is required to seal between the shaft 300 and the main housing 100a.

Hereinafter, such a sealing structure will be described in detail.

Figure 3:
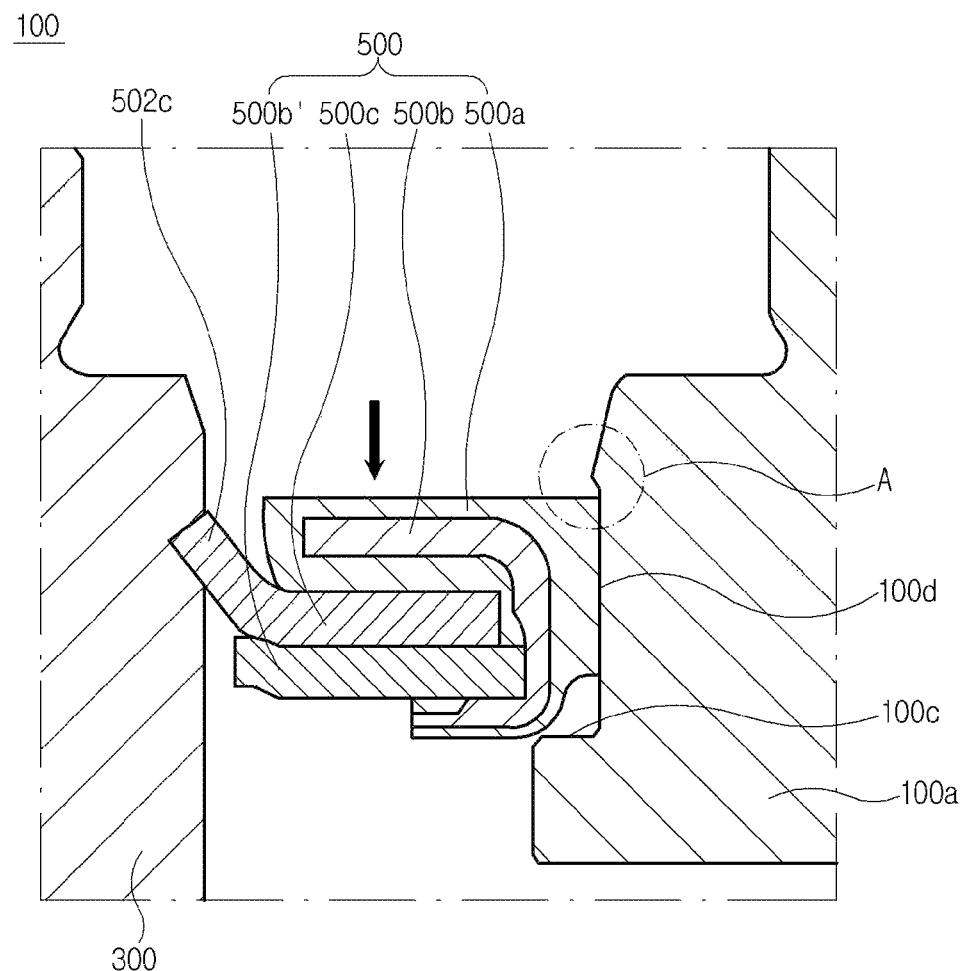
FIG. 3 is a cross-sectional diagram schematically illustrating a structure of a shaft seal according to an embodiment of the present disclosure.

FIG. 3 is a cross-sectional diagram schematically illustrating a structure of a shaft seal according to an embodiment of the present disclosure.

As illustrated in FIG. 3, in the electric compressor 100 according to an embodiment of the present disclosure, the shaft 300 is rotatably coupled inside the main housing 100a, and a shaft seal 500 is installed between the inner wall of the main housing 100a and the outer circumferential surfaces of the shaft 300.

For installing the shaft seal 500, a double stepped structure may be formed on the inner wall of the main housing 100a. A first stepped part 100c may be formed on a portion corresponding to an insertion direction (a direction from the top to the bottom with respect to FIG. 3) of the shaft seal 500 at one side of the inner wall of the main housing 100a, and a second stepped part 100d perpendicular to the first stepped part 100c may be formed.

The first stepped part 100c is formed in the insertion direction of the shaft seal 500 and serves to support the shaft seal 500 so that the shaft seal 500 is not pushed further than the installation position. Here, the first stepped part 100c may be formed to protrude further toward the shaft 300 than the protruding end (A), which will be described later, of the second stepped part 100d.

The second stepped part 100d is a portion where the shaft seal 500 is inserted and seated, and may be formed to be perpendicular to the first stepped part 100c and parallel to the outer circumferential surface of the shaft 300. Further, the second stepped part 100d may have a structure in which the end of the side where the shaft seal 500 is inserted protrudes (A) to prevent the shaft seal 500 from being separated toward the insertion direction in the state where the shaft seal 500 is inserted thereinto. The protruding end (A) preferably has a thickness enough for the shaft seal 500 to be inserted.

The shaft seal 500 is inserted into the outer circumferential surface of the shaft 300 and the inner circumferential surface of the main housing 100a and is inserted into a portion where a double stepped structure is formed. The shaft seal 500 is press-fitted into the insertion position so as not to be randomly separated when the shaft 300 is rotated. The shaft seal 500 is configured to include an elastic part 500a which forms an exterior, a rigid part 500b for maintaining a shape, and a sealing part 500c which contacts the shaft 300. An auxiliary rigid part 500b' may be additionally provided to support the sealing part 500c and maintain the shape thereof.

The elastic part 500a may have a substantially inverted '⊏'-shaped cross section with respect to FIG. 3 (this is based on the drawing direction, and a cross-section in another direction may have a '⊏' shape). The elastic part 500a has an exterior of the form which surrounds a part of the sealing part 500c so as to insert and support the sealing part 500c, and is made of a material such as elastic rubber. However, the elastic part 500a is not limited to the aforementioned shape. The elastic part 500a has a predetermined thickness so that the rigid part 500b may be inserted thereinto, and may be formed to be at least 1.5 to 2 times the thickness of the rigid part 500b. Further, the thickness of the elastic part 500a corresponds to the shape of the rigid part 500b, and the elastic part 500a may also be formed to be correspondingly thick at the place where the rigid part 500b is thick, and the elastic part 500a may also be formed to be correspondingly thinner than the other portions thereof at the place where the rigid part 500b is thin.

The rigid part 500b has a shape corresponding to the shape of the elastic part 500a, and is required to be inserted into the elastic part 500a, such that the rigid part 500b is formed to be smaller than the size of the elastic part 500a. The rigid part 500b is inserted into the elastic part 500a to support the elastic part 500a so that the shape of the elastic part 500a may be maintained, and the material thereof may be steel or the like.

The sealing part 500c has a bar-shaped cross section, and a part thereof is inserted into the bent portion of the elastic part 500a, and the other part thereof protrudes outward from the elastic part 500a. The protruding end of the sealing part 500c is defined as a protrusion end 502c'. The sealing part 500c maintains a straight shape before being inserted into the insertion position, and then the protrusion end 502c' may be press-fitted in an upward bent shape with respect to FIG. 3 while the sealing part 500c is inserted along the insertion direction (arrow direction in FIG. 3). Alternatively, the sealing part 500c may also be inserted after the protrusion end 502c' is shaped in a bent state, and when being inserted into the insertion position, the sealing part 500c may also be inserted and press-fitted into a space narrower than the length of the sealing part 500c and seated on the insertion position in a shape in which the protrusion end 502c' is further bent than the first bent state. The sealing part 500c is preferably made of a PTFE material having good wear resistance or the like because the protrusion end 502c' directly contacts the outer circumferential surface of the shaft 300.

Meanwhile, the auxiliary rigid part 500b' may be additionally inserted between one side of the sealing part 500c and the elastic part 500a. The auxiliary rigid part 500b' may be made of a steel material or the like, and is preferably formed with a shorter length than the sealing part 500c so as not to directly contact the shaft 300. The auxiliary rigid part 500b' may be interposed between the sealing part 500c and the rigid part 500b at the insertion direction side of the shaft seal 500 with respect to the sealing part 500c, and may play an auxiliary role in supporting the elastic part 500a and the sealing part 500c.

The shaft seal 500 is preferable formed so that a width of a straight line from the end of the sealing part 500c to the end of the elastic part 500a is greater than a width of a portion into which the shaft seal 500 is inserted (portion where the second stepped part of the inner wall of the housing is formed). Since the elastic part 500a is made of an elastic material and thus may be compressed and restored, the elastic part 500a may be compressed and inserted when being inserted into an insertion area having a narrower width than the shaft seal 500. After the shaft seal 500 is press-fitted, the elastic part 500a is restored, and is locked and maintained to the first stepped part 100c and the A portion of the main housing 100a. Accordingly, the elastic part 500a may maintain the state seated on the insertion position even without a fixing structure such as a separate retainer.

Accordingly, when the shaft seal according to the present disclosure is applied, the number of assembly parts and the number of assembly steps in the electric compressor may be reduced, thereby improving cost competitiveness.

An embodiment of the present disclosure described above and illustrated in the drawings should not be construed as limiting the technical spirit of the present disclosure. The scope of the present disclosure is limited only by the contents described in the claims, and those skilled in the technical field of the present disclosure may improve and change the technical spirit of the present disclosure in various forms. Accordingly, as long as these improvements and changes are obvious to those skilled in the art, they will fall within the scope of the present disclosure.

INDUSTRIAL APPLICABILITY

The present disclosure provides an electric compressor capable of fixing a shaft seal without a retainer for fixing the shaft seal.

What is claimed is:

1. An electric compressor comprising:
   a shaft which is rotatably coupled inside a main housing; and
   a shaft seal which is press-fitted between the shaft and the main housing, seals between the shaft and the main housing by an elastic structure, prevents deformation in the elastic structure with a rigid structure formed integrally with the elastic structure, and maintains the coupled position by a frictional force of the elastic structure,
   wherein a double stepped structure into which the shaft seal is inserted is formed on an inner wall of the main housing, and
   wherein the double stepped structure comprises a first stepped part which protrudes in an insertion direction of the shaft seal to lock and maintain the shaft seal, and a second stepped part which is perpendicular to the first stepped part,
   wherein the shaft seal comprises an elastic part which is inserted between the first stepped part and the second stepped part and the shaft,
   wherein the elastic part is made of an elastic material comprising rubber, wherein the elastic part is spaced apart from an outer circumferential surface of the shaft,
   wherein the second stepped part comprises an end which protrudes from the end of a side into which the shaft seal is inserted to the insertion direction of the shaft seal, and
   wherein the elastic part is compressed when the shaft seal is inserted into the double stepped structure, is restored after the shaft seal is inserted into the double stepped structure, is in contact with the inner wall of the main housing, and is locked and maintained to the first stepped part and the end.

2. The electric compressor of claim 1, wherein the first stepped part is formed to protrude further toward the shaft than the end.

3. The electric compressor of claim 1, wherein the shaft seal further comprises:
a rigid part which is inserted into the elastic part; and
a sealing part which is inserted into the elastic part.

4. The electric compressor of claim 3, wherein the rigid part is made of a metallic material comprising steel, and
wherein the sealing part is made of a wear resistance material comprising PTFE.

5. The electric compressor of claim 4, wherein the elastic part is formed to have a shape which surrounds a part of the sealing part, and
wherein the rigid part is formed to have a shape which corresponds to the shape of the elastic part.

6. The electric compressor of claim 5, wherein a part of the sealing part is inserted into a bent portion of the elastic part,
wherein the other part of the sealing part protrudes outward from the elastic part, and
wherein assuming that the part of the sealing part which protrudes outward from the elastic part is referred to as a protrusion end, the protrusion end contacts the outer circumferential surface of the shaft.

7. The electric compressor of claim 6, wherein the protrusion end is bent in a direction opposite to the insertion direction while being inserted along the insertion direction of the shaft seal.

8. The electric compressor of claim 6, wherein a width from the end of the sealing part to the end of the elastic part is formed to be greater than a width between the outer circumferential surface of the shaft and the second stepped part; wherein the width is measured in a radial direction at undeformed condition.

9. The electric compressor of claim 6, wherein the shaft seal further comprises an auxiliary rigid part which is made of a metallic material and has a shorter length than the sealing part, and the sealing part of the shaft seal is inserted between one side of the auxiliary rigid part and the inside of the elastic part.

10. The electric compressor of claim 9, wherein the auxiliary rigid part is spaced apart from the shaft.

11. The electric compressor of claim 9, wherein the auxiliary rigid part is interposed between the sealing part and the rigid part at the insertion direction side of the shaft seal with respect to the sealing part and supports the sealing part and the elastic part.

12. The electric compressor of claim 1, wherein the shaft seal seals a back pressure chamber.

\* \* \* \* \*